Sept. 1, 1959  P. A. HAUCK  2,902,181
APPARATUS FOR PERFORMING TREATMENT OPERATIONS ON WORKPIECES
Filed Aug. 16, 1956  12 Sheets-Sheet 3

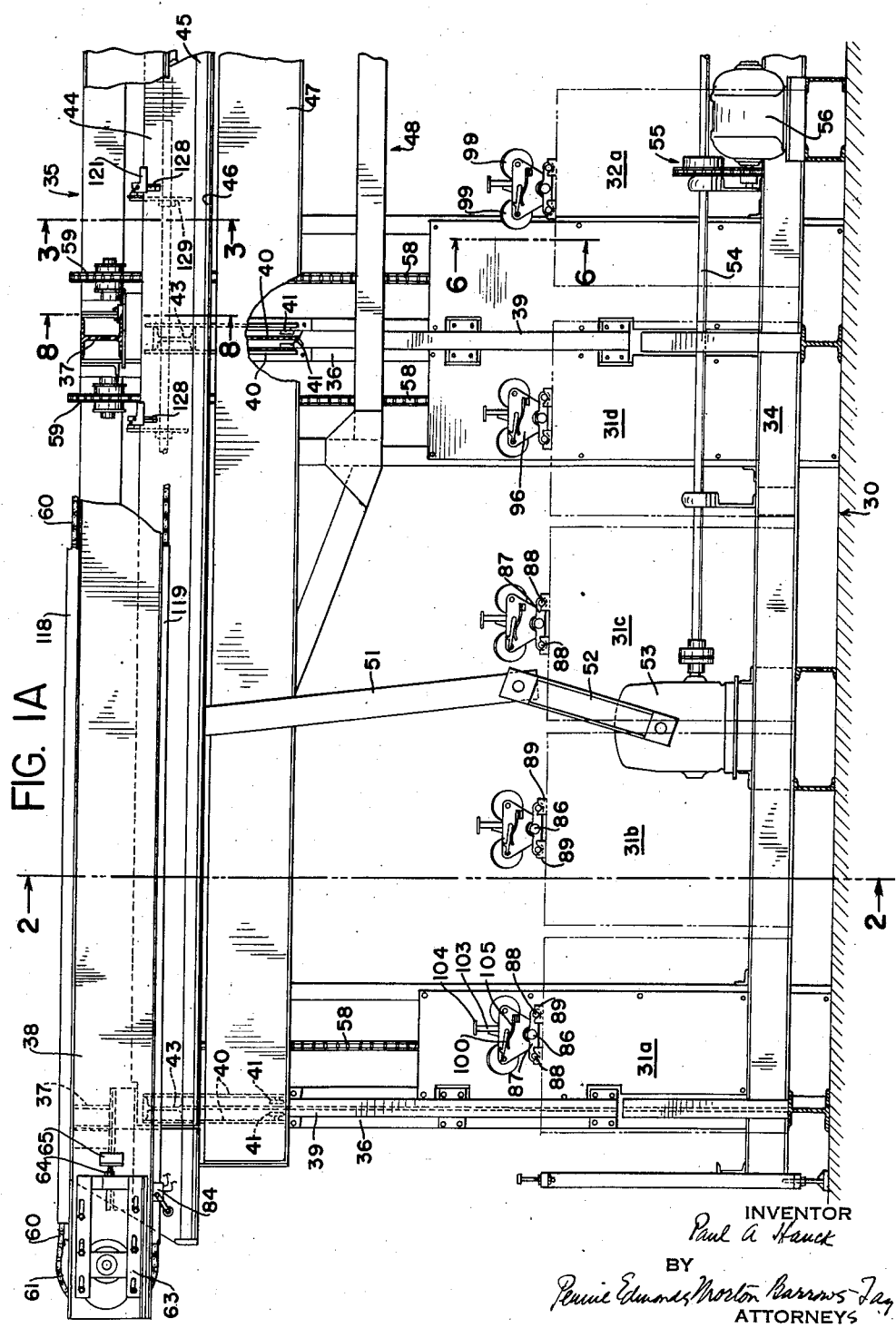

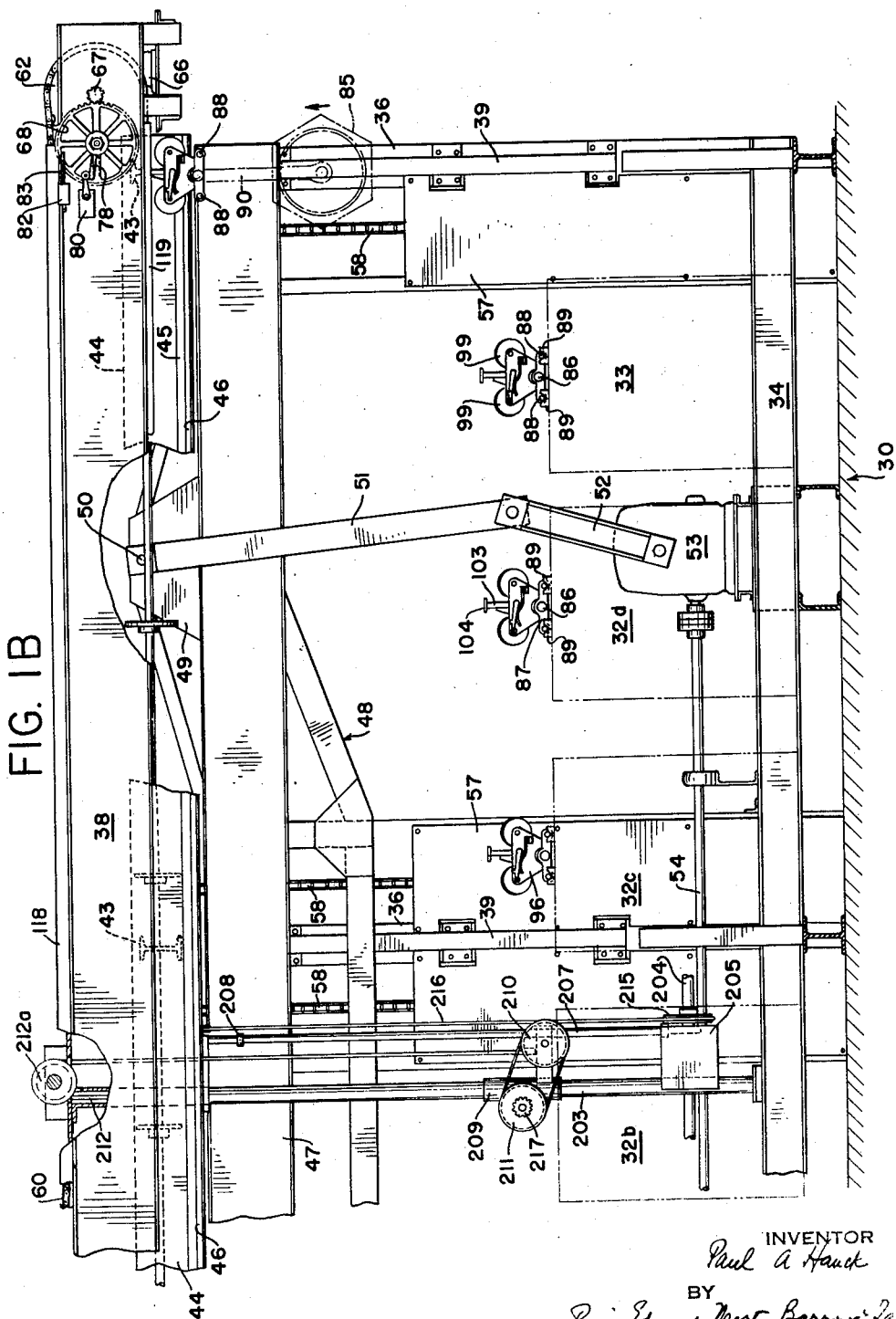

INVENTOR
Paul A. Hauck
BY
Pennie Edmonds Morton Barrows Taylor
ATTORNEYS

Sept. 1, 1959            P. A. HAUCK           2,902,181
APPARATUS FOR PERFORMING TREATMENT OPERATIONS ON WORKPIECES
Filed Aug. 16, 1956                          12 Sheets-Sheet 4
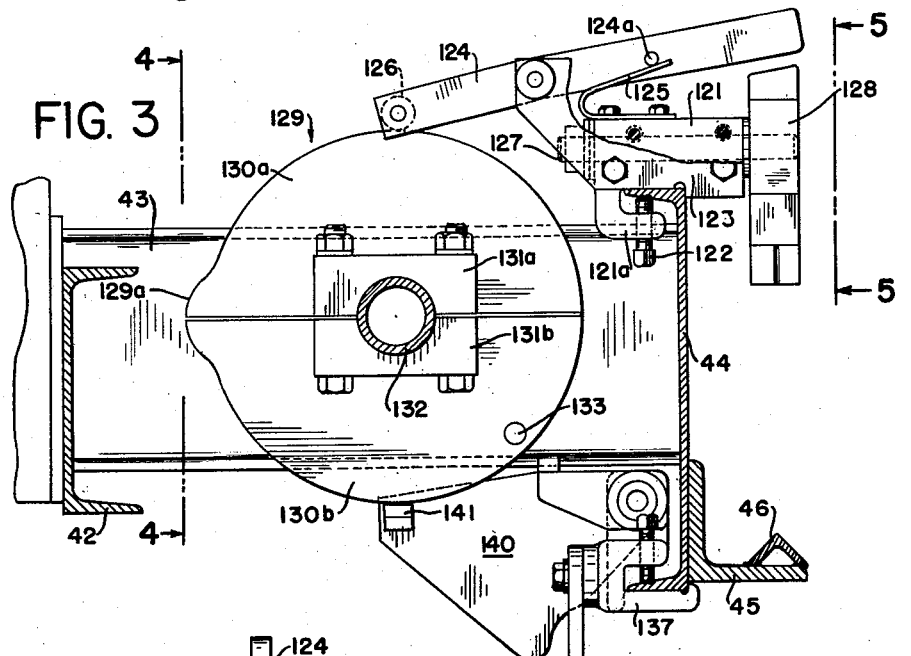
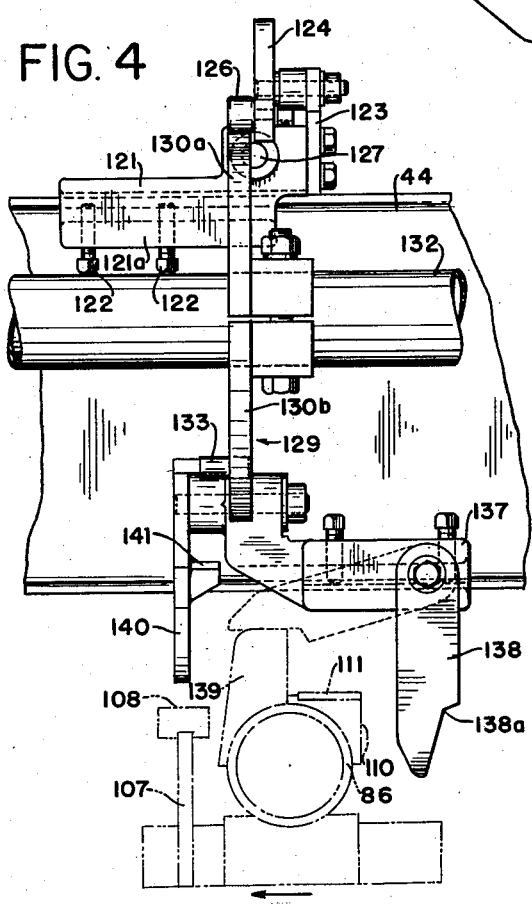
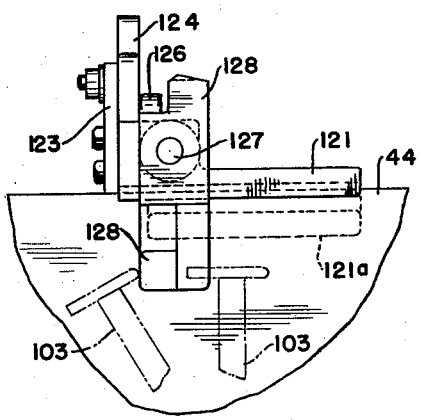
INVENTOR
Paul A. Hauck
BY
Pennie Edmonds Morton Barrows Taylor
ATTORNEYS

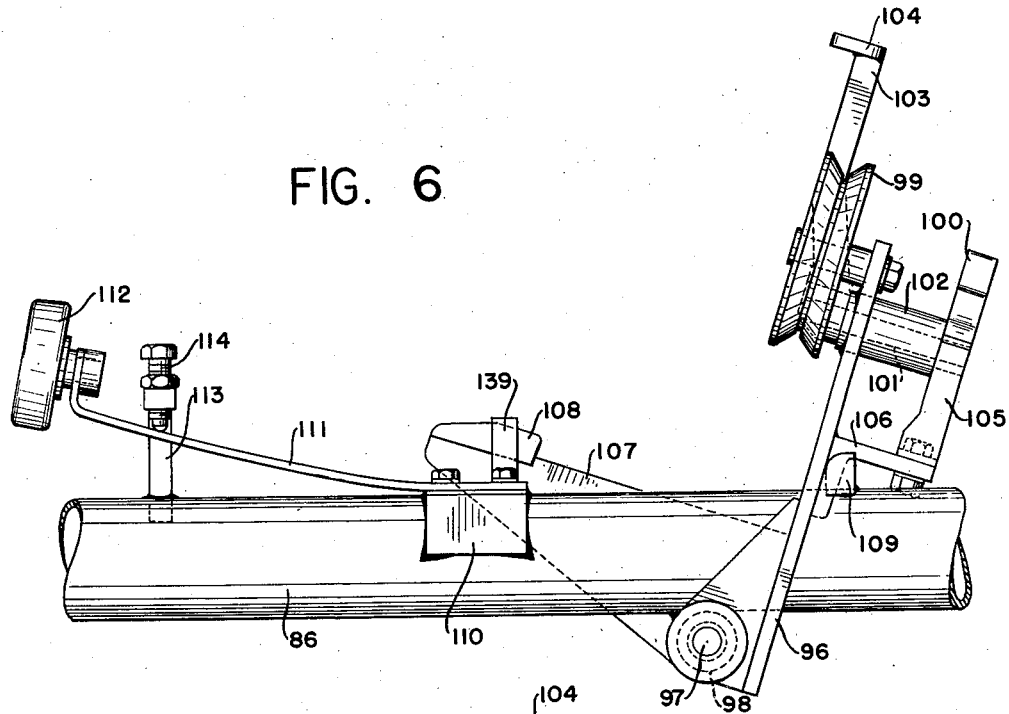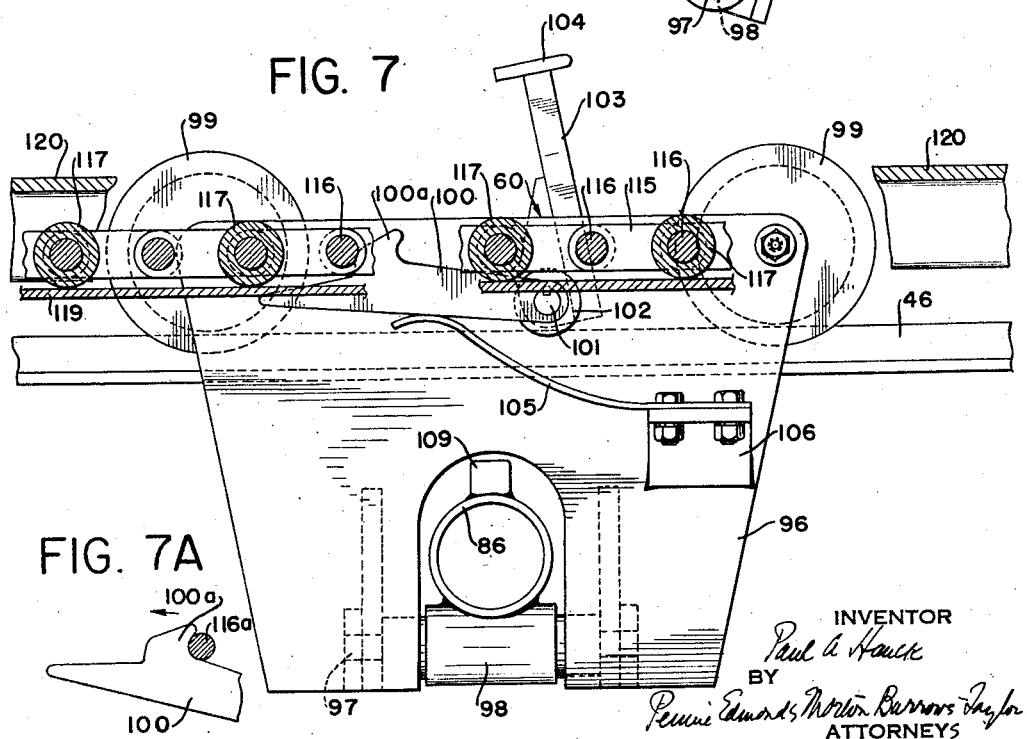

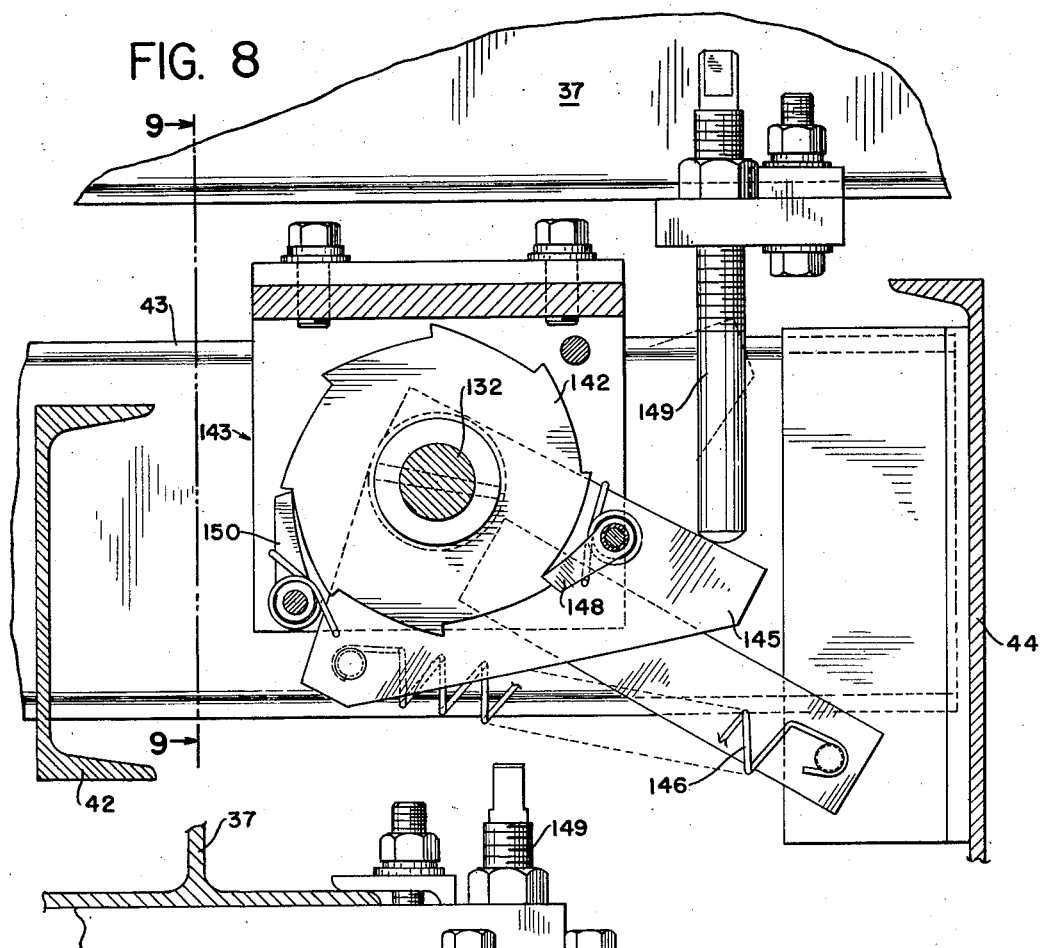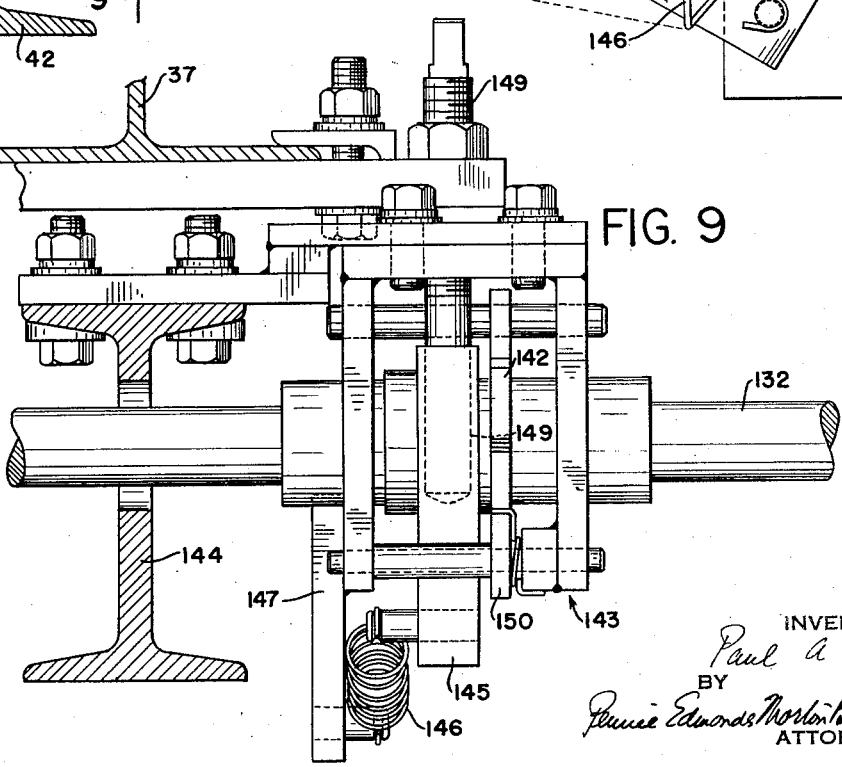

Sept. 1, 1959     P. A. HAUCK     2,902,181
APPARATUS FOR PERFORMING TREATMENT OPERATIONS ON WORKPIECES
Filed Aug. 16, 1956     12 Sheets-Sheet 7

INVENTOR
Paul A. Hauck
BY
Pennie Edmonds Morton Barrows Taylor
ATTORNEYS

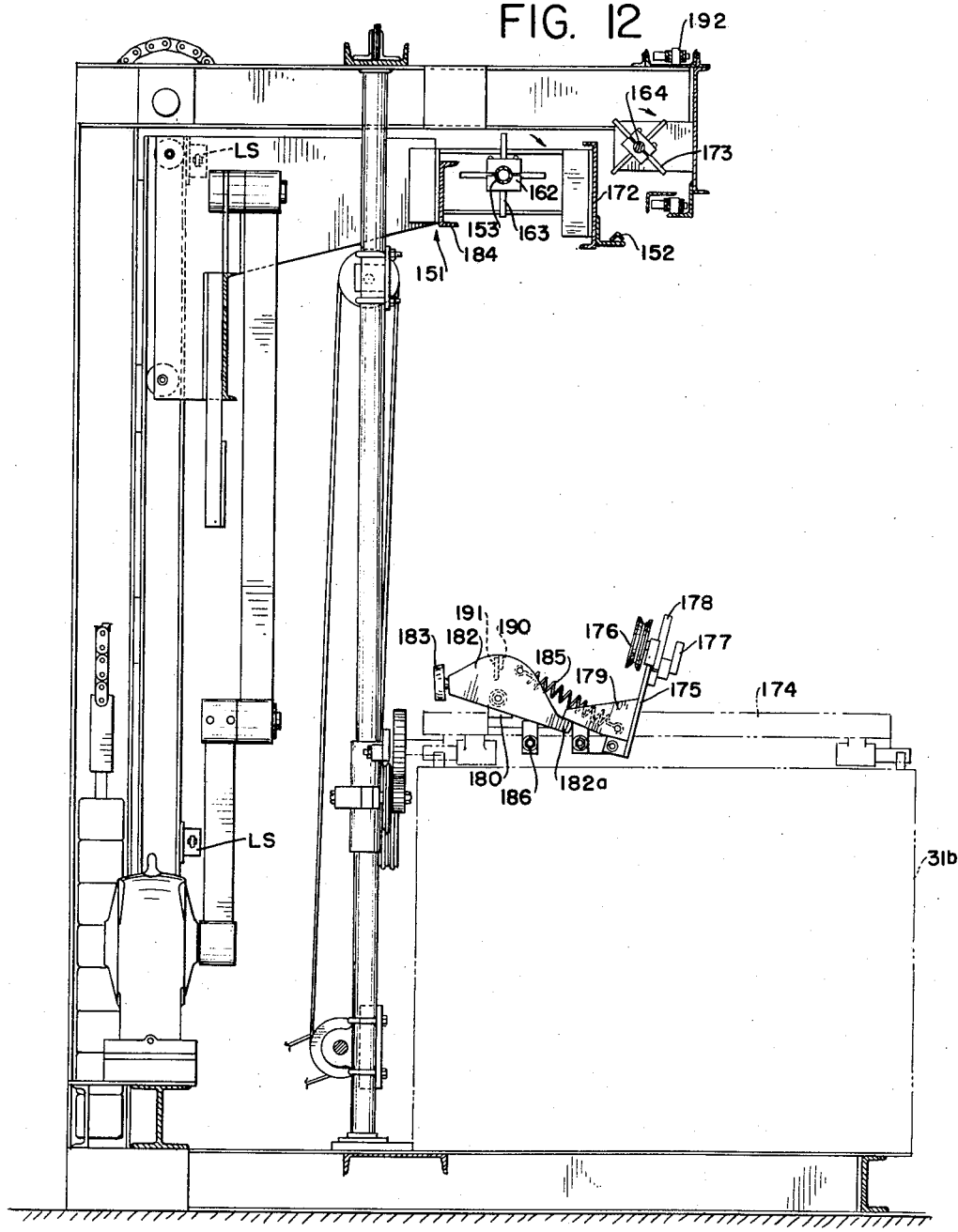

Sept. 1, 1959 P. A. HAUCK 2,902,181
APPARATUS FOR PERFORMING TREATMENT OPERATIONS ON WORKPIECES
Filed Aug. 16, 1956 12 Sheets-Sheet 9
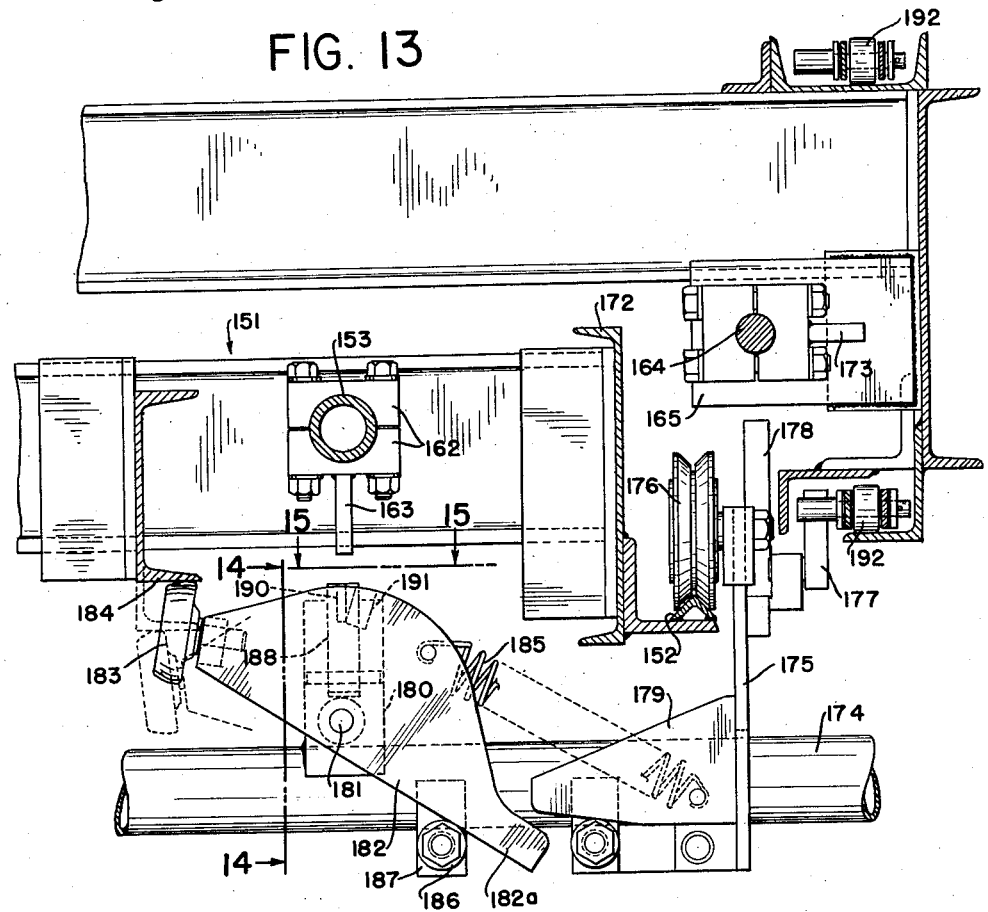
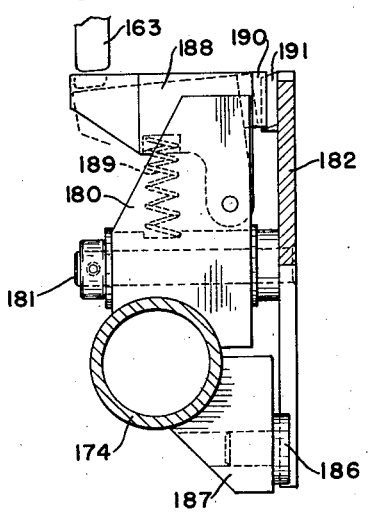
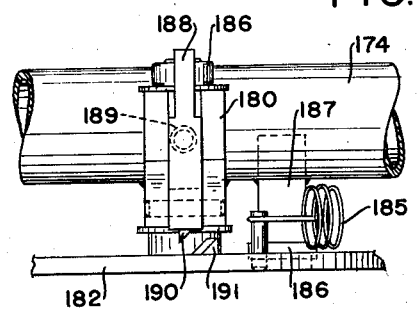
INVENTOR
Paul A. Hauck
BY
ATTORNEYS Sept. 1, 1959 P. A. HAUCK 2,902,181
APPARATUS FOR PERFORMING TREATMENT OPERATIONS ON WORKPIECES
Filed Aug. 16, 1956 12 Sheets-Sheet 10
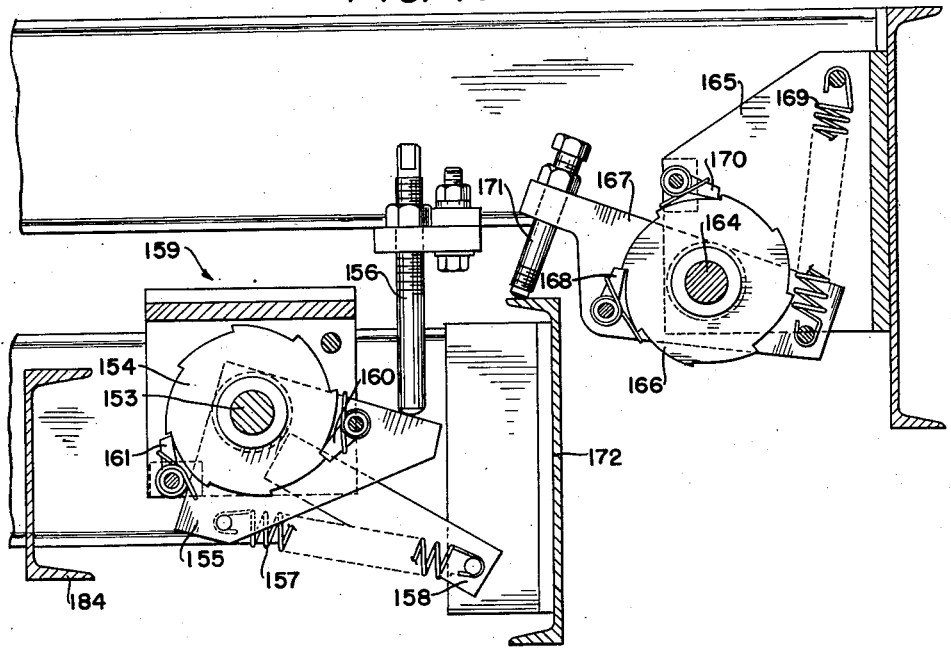
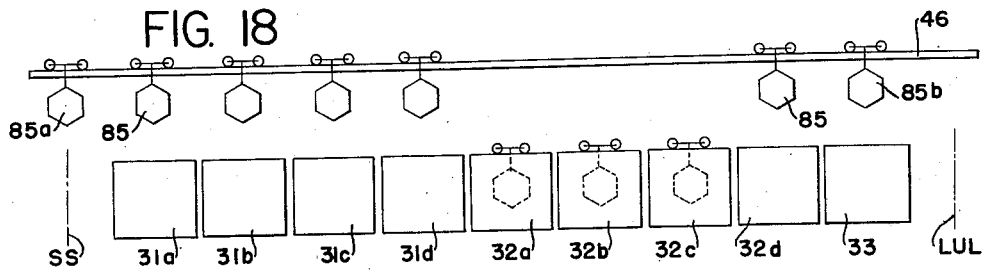
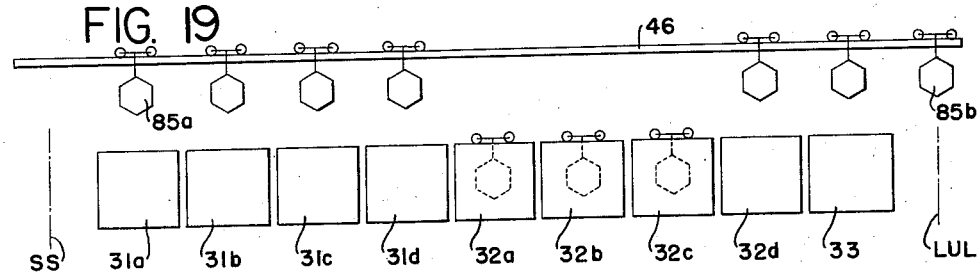
INVENTOR
Paul A. Hauck
BY
Pennie Edmonds Morton Barrows Taylor
ATTORNEYS Sept. 1, 1959 P. A. HAUCK 2,902,181
APPARATUS FOR PERFORMING TREATMENT OPERATIONS ON WORKPIECES
Filed Aug. 16, 1956 12 Sheets-Sheet 11
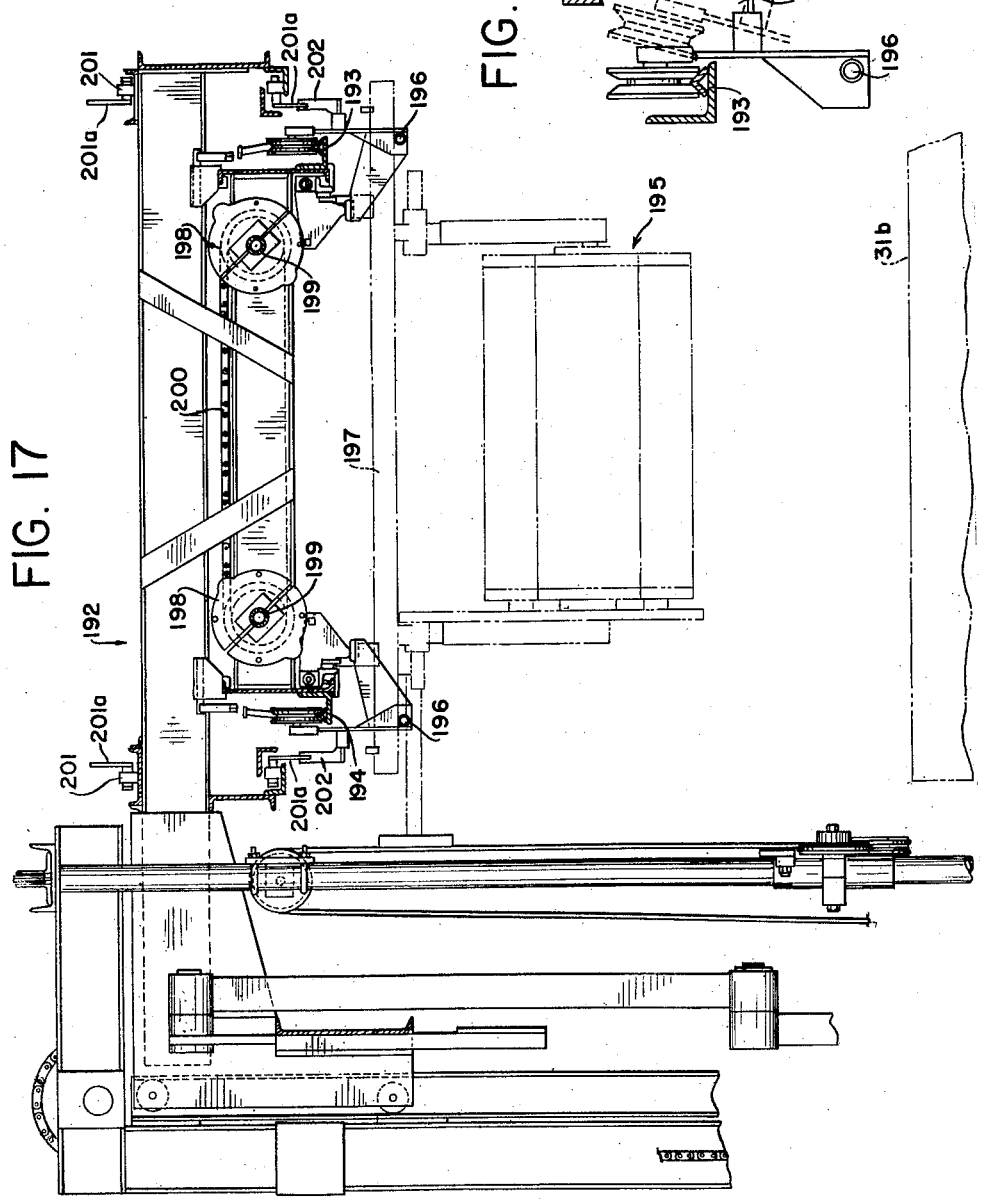
INVENTOR
Paul A. Hauck
BY
Pennie Edmonds Morton Barrows Taylor
ATTORNEYS Sept. 1, 1959 P. A. HAUCK 2,902,181
APPARATUS FOR PERFORMING TREATMENT OPERATIONS ON WORKPIECES
Filed Aug. 16, 1956 12 Sheets-Sheet 12
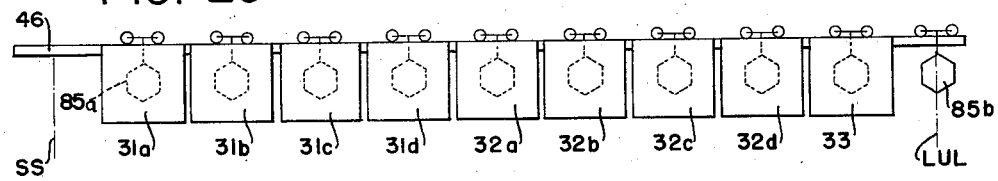
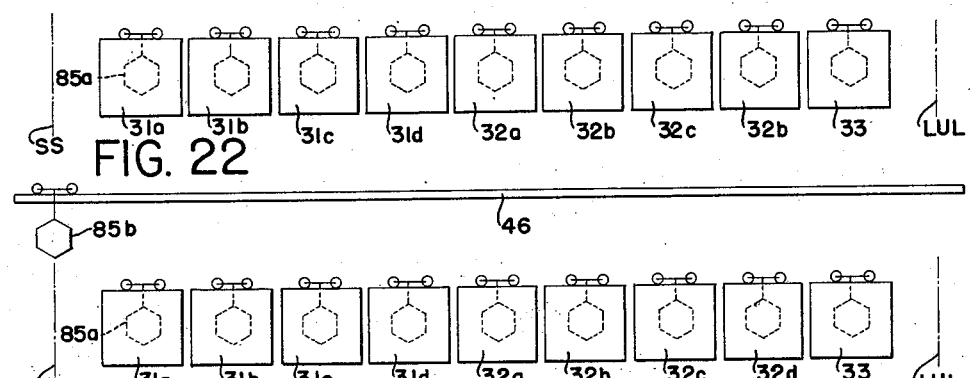
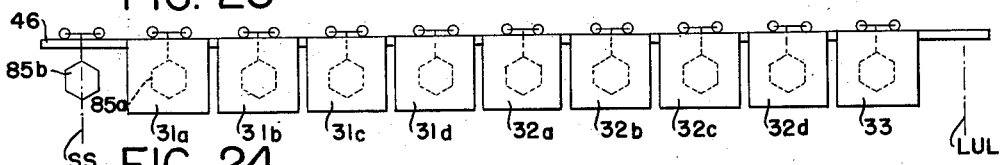
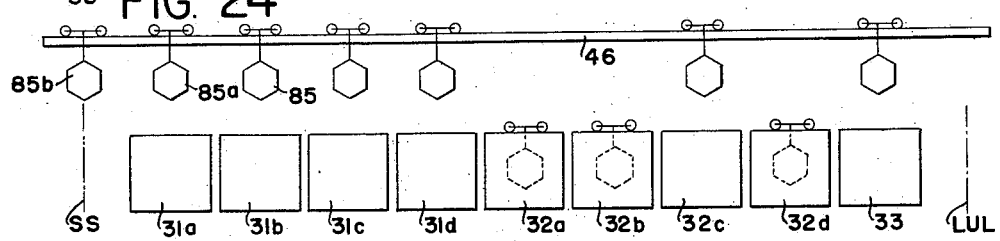
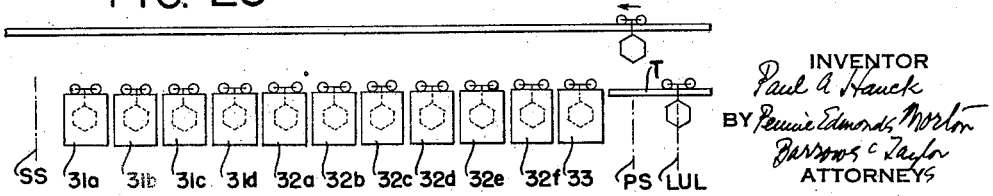
INVENTOR
Paul A. Hauck
BY
ATTORNEYS

United States Patent Office 2,902,181
Patented Sept. 1, 1959

2,902,181

APPARATUS FOR PERFORMING TREATMENT OPERATIONS ON WORKPIECES

Paul A. Hauck, Union, N.J., assignor to Hanson-Van Winkle-Munning Company, Matawan, N.J., a corporation of New Jersey Application August 16, 1956, Serial No. 604,427

30 Claims. (Cl. 214—89)

This invention relates to processing machinery for automatically transporting workpieces to successive work stations, at which they are subjected to different treatments, and to methods of operating such machinery. More particularly, the invention is concerned with a novel machine of the type referred to, which is capable of use in carrying out processes involving treatments differing in duration, so that the workpieces must remain at some stations longer than at others, and with a method of operating the machine. The new method and machine may be employed for various purposes as, for example, for electroplating, hot dipping, heat treatments, etc., but, since all the advantages of the invention are realized in its application to electroplating, a form of the method and machine, which embody the invention and are suitable for such use will be illustrated and described in detail for purposes of explanation.

Automatic electroplating machines commonly include a plurality of preparation or pre-plating tanks containing solutions for cleaning, rinsing, etching, and other treatments of the workpieces, one or more planting tanks, and a plurality of finishing or post-plating tanks for reclaim, hot, and cold rinsing, etc. In such machines as usually constructed, the workpiece carriers are advanced along the machine stepwise by a conveyor and an elevator operating in timed relation with the conveyor raising and lowering the carriers, so that they may be moved in elevated position over the end of each tank and then lowered for immersion of the workpieces in the following tank. Most of the preparation and finishing tanks are of unit size and a carrier is advanced from one tank to the next in each step of the conveyor. The plating operation requires a longer time than any of the preparation and finishing treatments so that, in some machines, the plating is carried on in tanks of multiple unit size, which provide a plurality of plating positions. A carrier is then lowered to immerse its workpieces at the first plating position in the first tank and is advanced along the tank with the workpieces immersed during a number of conveyor steps and until the carrier must be raised out of the tank and lowered into the next one.

Many articles can be satisfactorily plated by moving them through a plating tank between laterally disposed anodes, but articles of some shapes must remain at rest within a group of anodes in order to receive an even plating. Also, when small objects are plated in bulk in barrels supported with their axes at right angles to the direction of conveyor movement, it is desirable to permit each barrel to remain at a single plating station until the plating is completed. The machines, in which there are a plurality of plating stations and the articles remain at the respective stations during plating, are said to operate in a skip-stop cycle. In such machines, the workpiece carriers are moved along the preparation tanks stepwise in the usual way and are then transferred from the final preparation tank to successive working positions at the plating station until all such positions are filled. The carrier in the first position is then removed and delivered to the first finishing tank and a carrier is transferred from the last preparation tank to the vacated plating position. In each minor cycle of operation of the machine, carriers are moved along the pre-plating and finishing tanks and one plating position is emptied and refilled, so that the minor cycles differ from one another in the length of the conveyor movements during the emptying and filling of a plating position. In successive minor cycles, the carriers at the several plating positions are successively removed and replaced and, when all the plating positions have thus been emptied and refilled, a major cycle of machine operation has been completed and starts again.

In skip-stop machines as heretofore constructed with a single conveyor extending along the preparation, plating, and finishing tanks, the workpiece carriers are so handled that, when carriers are being advanced along the preparation and finishing tanks, there is no removal of a carrier from or delivery of a carrier to a plating position. Similarly, during the conveyor movements, in which plating cells are being emptied and filled, there is no movement of workpiece carriers along the preparation and finishing tanks. As a result of this mode of operation, a substantial part of the operating time of the machine is devoted to the movement of the carriers and, frequently, the time available for loading and unloading the carriers is undesirably short. Also, in prior skip-stop machines employing a single conveyor, many trips of the elevator are necessary in each major cycle and highly complex control means are required, because of the difference in length of the conveyor movements in the minor cycles. Movements of the carriers simultaneously along the pre-plating, plating, and post-plating tanks can be carried on but, for this purpose, the machine must be provided with a plurality of elevators and conveyors.

The present invention is, accordingly, directed to the provision of a processing machine of the skip-stop type, which affords advantages over prior similar machines, in that a single conveyor moving in a simple repetitive cycle is employed and movements of the workpiece carriers along the pre-treatment, treatment, and post-treatment stations can take place simultaneously. As a result, only a single elevator is required, the number of elevator movements required is reduced, the control mechanism is simplified, and extra time for loading and unloading is provided. In the new machine, the reduction of the portion of each minor cycle employed in moving the carriers makes it possible to maintain a given production rate with less treatment stations than is normally required in such machines or to increase the production rate without an increase in stations. In addition, the machine is highly flexible, in that the station spacing may be non-uniform and the loading and unloading stations may both be at either end of the machine or may be at opposite ends.

The new machine includes a single conveyor and a single elevator providing a track extending along the pre-treatment, treatment, post-treatment, and loading and unloading stations and the workpiece carriers are provided with rolling carriages movable along the track and selectively controllable, so that the carriers may be picked up or left behind as the elevator rises. When a carrier is raised by the elevator, the carriage of the carrier is automatically connected to the conveyor for movement therewith. Above the stations are stop means, which are engageable by the carriages moving with the conveyor and act to release the carriages from the conveyor and arrest them in desired locations with reference to the respective stations beneath them. The stop means above the pre-treatment and post-treatment stations function at all times, but the stop means above the respective positions of the treatment station operate cyclically to cause carriers to be delivered to the positions in sequence.

The elevator carries means for acting on the carriages of carriers in the down position to cause the carriers to be picked up by the elevator and such means at the preparation and finishing stations act on all the carriages while the means at the several positions of the treatment station function on the carriages one at a time and in a cycle.

For a better understanding of the invention, reference may be made to the accompanying drawings, in which Fig. 1A is a view in front elevation of the left-hand end of one form of processing machine embodying the invention;

Fig. 1B is a view similar to Fig. 1A showing the right-hand end of the machine;

Figs. 2 and 3 are sectional views on the lines 2—2 and 3—3, respectively, of Fig. 1A;

Figs. 4 and 5 are fragmentary elevational views on the lines 4—4 and 5—5, respectively, of Fig. 3;

Fig. 6 is a sectional view on line 6—6 of Fig. 1A;

Fig. 7 is a sectional view on the line 7—7 of Fig. 2, but with the latch shown in position to cause its carrier to be advanced;

Fig. 7A is a fragmentary elevational view showing the latch in position to cause its carrier to be moved rearward;

Fig. 8 is a sectional view on the line 8—8 of Fig. 1A;

Fig. 9 is a sectional view on the line 9—9 of Fig. 8;

Fig. 12 is a sectional view similar to Fig. 2 but showing a modified construction;

Fig. 13 is a fragmentary vertical sectional view showing part of a carrier illustrated in Fig. 12 raised by the elevator;

Figure 2:
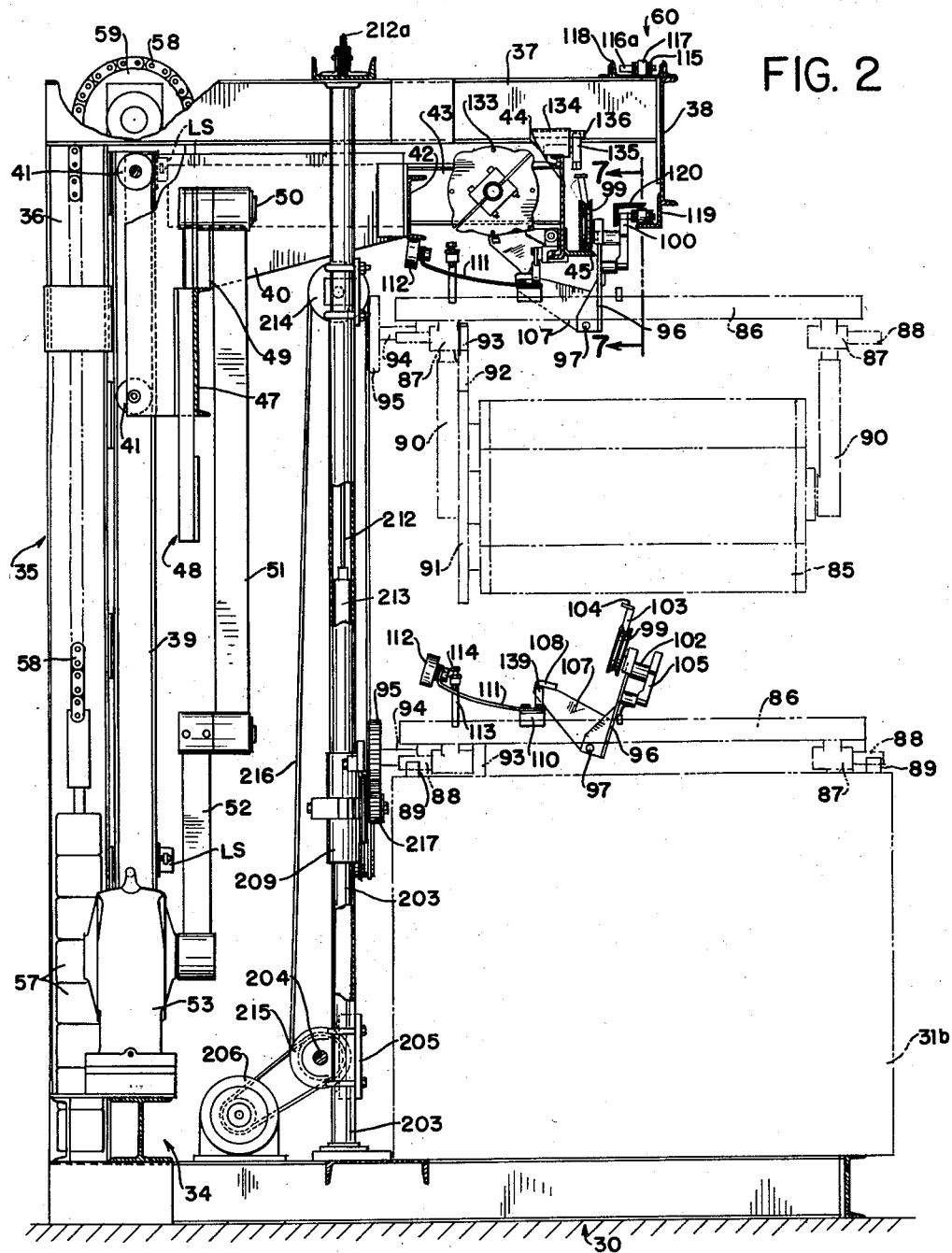
Figure 10:
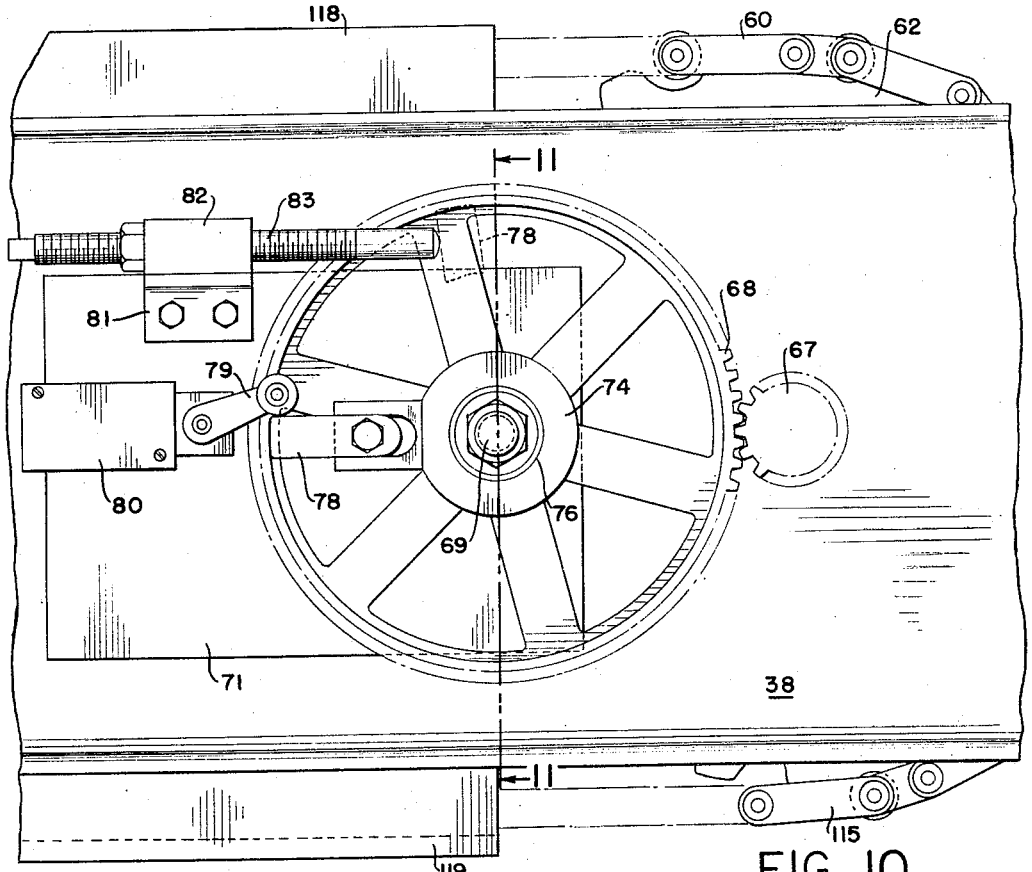
Fig. 10 is a front elevational view of a device for controlling the conveyor.

Figs. 14 and 15 are sectional views on the line 14—14 and 15—15, respectively, of Fig. 13;

Fig. 16 is a view similar to Fig. 8 but showing features of the modified machine of Fig. 12;

Fig. 17 is a sectional view similar to Fig. 2 showing a modified construction;

Fig. 17a is a fragmentary sectional view of parts shown in Fig. 17 but on a larger scale;

Figs. 18 to 24, incl., are diagrammatic side elevational views showing the mode of operation of the machine; and Fig. 25 is a diagrammatic side elevational view showing the mode of operation of a modified form of the machine.

The processing machinery for electroplating, which is illustrated in the drawings, includes a base structure 30 formed of longitudinal and transverse beams and channel members resting on any suitable foundation. The base supports a row of tanks disposed at the respective stations and, in the machine shown, there are four preparation or pre-plating tanks 31a, 31b, 31c, 31d, which contain solutions for preliminary treatments, such as cleaning, etching, rinsing, etc. The plating operation is carried on at a station having four treatment positions with tanks 32a, 32b, 32c, 32d at those positions and beyond the plating station is a single tank 33 for a post-plating or finishing treatment, such as cold rinsing. It is to be understood that the machine may have stations differing in number and arrangement from those shown and the size and spacing of the tanks may vary and need not be uniform throughout the machine.

At the rear (Fig. 2), the base has a raised portion 34 formed of structural members and extending from one end of the base to the other. A framework 35 rises from the raised part of the base and it is made up of spaced vertical structural members 36, horizontal beams 37 extending forwardly therefrom at intervals to overlie the base, and a channel member 38 connected to the forward ends of the beams 37. The framework includes a plurality of spaced vertical beams 39, which serve as tracks for an elevator.

The elevator comprises pairs of brackets 40 having rollers 41 lying on opposite sides of the webs of beams 39 and movable along the flanges of the beams. The outer ends of the brackets are connected by a channel member 42 and a beam 43 lying between the brackets of each pair projects outwardly beyond the member 42. The ends of the beams 43 are connected by a channel member 44 (Fig. 3) carrying an angle member 45 with one flange extending outwardly from the web of member 44 in a horizontal plane. An angle member 46 with the edges of its flanges secured to the top of the horizontal flange of member 45 provides a track extending the entire length of the elevator.

The vertical arms of brackets 40 are connected by a channel member 47, which is strengthened by a framework 48 and carries spaced plates 49 (Fig. 1B) having pivot pins 50, on which the upper ends of connecting rods 51 are mounted. The lower end of each connecting rod is pivotally connected to a crank arm 52 attached to the output shaft of a speed reducing device 53 resting on the elevated part 34 of the base. The input shafts of the speed reducers are connected to a common shaft 54, which is driven through a chain and sprocket wheel drive 55 by a motor 56 carried by the base. The elevator structure is provided at spaced intervals with counterweights 57 connected to the structure by chains 58, which pass over sprocket wheels 59 mounted for rotation on the framework 35.

Figure 11:
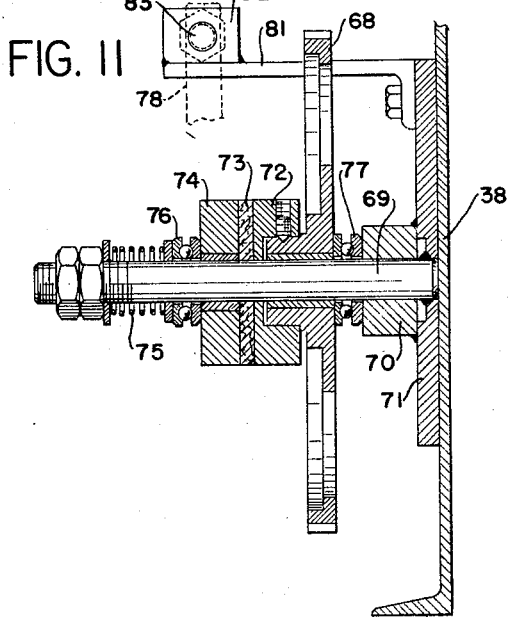
Fig. 11 is a sectional view on the line 11—11 of Fig. 10.

A conveyor is mounted on the framework and it includes a chain 60 trained about sprocket wheels 61, 62 at opposite ends of the framework. The sprocket wheel 61 is mounted on a shaft supported for rotation in a bearing in a slide 63 movable lengthwise on channel member 38 and adjustable to keep the chain taut by a screw 64 engaging the slide and a stop 65 on member 38. The sprocket wheel 62 is secured to the output shaft of a speed reducer (not shown) mounted at the top of framework 35 and driven by a motor 66. A pinion 67 on the shaft carrying sprocket wheel 62 meshes with a gear 68 mounted for rotation on a fixed shaft 69 (Fig. 11) supported in a collar 70 attached to a plate 71 secured to the outer face of the channel member 38.

The gear 68 forms part of a device for controlling the movements of the conveyor and the hub of the gear carries a collar 72 encircling the shaft 69 and engaging a flat ring 73 of friction material surrounding the shaft. A collar 74 loose on the shaft engages the other face of ring 73 and is urged toward the ring by a coil spring 75 acting through a ball bearing 76. A similar ball bearing 77 lies between the hub of gear 68 and the collar 70. The collar 74 carries a radially adjustable arm 78 in position to engage the operating arm 79 of a limit switch 80 as the collar 74 is rotated. A bracket 81 secured to the outer face of plate 71 carries a block 82, through which is threaded a stop pin 83 in position to engage the arm 78, when collar 74 rotates in one direction.

In the operation of the machine, the arm 78 lies against the end of stop pin 83 when the conveyor motor is started to advance the lower stretch of the conveyor along the tanks toward the post-plating tank 33. During such movement of the conveyor, the pinion 67 rotates counter-clockwise and gear 68 rotates clockwise, so that the arm 78 moves away from pin 83. When arm 78 engages and moves the operating arm 79 to actuate limit switch 80, the conveyor comes to rest. After the proper interval, the conveyor motor is started in the reverse direction by a timer with the result that pinion 67 rotates clockwise and gear 68 counter-clockwise. When arm 78 reaches the stop pin 83, the arm and collar 74 are held against angular movement, while the conveyor continues its return movement and gear 68 continues to rotate because of the slippage in the clutch formed by collars 72 and 74 with the ring 73 of friction material between them. The return movement of the conveyor is stopped by actuation of limit switch 84 (Fig. 1A) by the carriage of a workpiece carrier being moved by the conveyor. The movement of the arm 78 from stop pin 83 to the point where the arm actuates limit switch 80 to stop the conveyor corresponds to a conveyor advance longer than the length of the plating station but less than the total length of all the stations, while the return movement is longer than the total length of the stations. In the machine described, the conveyor advance is about 4½ times the tank spacing and the return movement about 10 times the tank spacing.

The machine illustrated is for electroplating small articles, which are carried through the machine in barrels of hexagonal cross-section, one of which is shown at 85 (Fig. 2). The barrels are supported in carriers, which include a top bar 86 provided at its ends with cross-pieces 87 having projecting pins 88 receivable in saddles 89 at the top of the tanks. A pair of hangers 90 extending downward from the cross-pieces support shafts at the ends of the barrel for rotation and the shaft at the inner end of the barrel carries a gear 91 meshing with an idler gear 92 on hanger 90 and driven by a gear 93 on a shaft 94 mounted for rotation in the inner cross-piece 87 of the carrier. The shaft 94 carries a gear 95, by which it may be driven, as will be later described.

Each carrier depends from a carriage, which comprises a plate 96 (Figs. 6, 7) encircling the bar 86 of the carriage and pivotally mounted on a pin 97 in a collar 98 secured to the under surface of the bar. The plate carries a pair of grooved rollers 99 mounted for free rotation on studs extending through the plate toward the rear, and the bottoms of the grooves of the rollers lie substantially in a plane through the axis of pin 97. A latch 100 is attached rigidly on the forward end of shaft 101 supported for rotation in bearings in a sleeve 102 mounted in an opening through plate 96 and an arm 103 mounted fast on the rear end of the shaft extends upwardly above the plate and carries a triangular plate 104 at its upper end. The latch is supported by a leaf spring 105 secured to a bracket 106 attached to the front face of plate 96. An arm 107 rigidly attached to plate 96 extends rearwardly therefrom and, at its top, carries a pad 108 of greater width than the thickness of the plate. By depression of arm 107, the plate 96 may be placed in substantially vertical position. When released from such position, the weighting of the plate assembly is such that the plate swings forwardly to come to rest against a pad 109 secured to the top surface of bar 86 forwardly from the vertical plane through pin 97.

A bracket 110 secured to bar 86 carries a leaf spring 111 extending rearwardly and carrying a roller 112 at its free end. An arm 113 attached to bar 86 overhangs the spring and carries an adjustable stop 114, which limits the upward movement of the spring. The carriage of a carrier is attached to the top bar 86 inward from the central plane through the barrel, so that the outer end of the barrel tends to lie at a level lower than that of the inner end. This tendency is counteracted by engagement of roller 112 with the bottom flange on channel member 42, when the carrier is supported by the elevator.

The chain 60 of the conveyor is formed of two rows of links 115 (Fig. 2) connected by pins 116 with rollers 117 encircling the pins between the rows of links. The rollers of the upper stretch of the chain run on a track formed by the web of a channel member 118 supported by the beams 37 and the rollers in the lower stretch of the chain run on a track formed by one flange of an angle iron 119 depending from the channel member 38. A second angle iron 120 attached to the framework overlies the lower stretch of the chain. Each pin of the chain has a portion 116a projecting rearwardly beyond the inner row of links and engageable at either side by hooks 100a on the latches 100 on the carriages, so that the latches may connect their carriages to the chain for movement in either direction.

In the operation of the apparatus, carriages with their wheels 99 resting on the track 46 of the elevator are advanced along the track by engagement of their latches 100 with the pins 116a on the conveyor chain 60 and, when a carriage has been advanced through the desired distance, it is stopped by release of its latch from the conveyor chain. Carriages moving along the pre-plating tanks, such as tank 31a, and leaving the finishing tank 33 advance by one tank in each forward movement, while carriages being moved to and from the plating tanks 32a advance varying distances in their forward movements. The stopping of the carriages by release of their latches from the conveyor chain is accomplished by means of fixed and movable stops mounted on the elevator and engaging the arms 103 on the carriages. The fixed stops are disposed above the pre-plating and post-plating tanks, while the movable stops are disposed above the plating tanks.

Each movable stop (Fig. 3) comprises a bracket 121 resting on the top flange of channel member 44 and having an extension 121a underlying the flange and carrying screws 122 threaded against the under surface of the flange and holding the bracket tightly in place. A plate 123 secured to the bracket pivotally supports an arm 124 urged in one direction by means of a spring 125 secured to the top of the bracket and engaging a pin 124a on the arm. At its inner end, arm 124 carries a cam follower roller 126. A pivot pin 127 mounted in bracket 121 supports an arm 128 for swinging movement in a vertical plane through the track 46 and such movement in one direction may be stopped by the forward end of arm 124 when the arm is swung against the face of its spring 125. The position of the arm 124 is determined by a cam 129 made up of a pair of plates 130a, 130b attached to blocks 131a, 131b clamped on a shaft 132 mounted for rotary movement on the elevator. The cam has a lobe 129a engageable by roller 126 to swing arm 124 to place its forward end in position to prevent swinging movement of arm 128 in one direction. The cam also carries a pin 133 for a purpose to be described.

Each fixed stop comprises a bracket 134 (Fig. 2) similar to bracket 121 and adjustably secured to the top flange of channel member 44. Each bracket 134 carries an arm 135 pivotally mounted thereon and a fixed pin 136 in position to be engaged by the upper end of arm 135 to prevent angular movement of the arm in one direction.

A bracket 137 is mounted on the lower flange of channel member 44 below each of the fixed and movable stops and an arm 138 (Fig. 4) is pivotally mounted on the bracket in position to be engaged and swung aside by a fixed arm 139 secured to the top bar 86 of each carriage moving along the elevator track. When a carriage is stopped by one of the fixed or movable stops, the arm 138 has been swung to rest upon the top of the fixed arm 139 on the bar 86 of the carriage and a shoulder 138a on arm 138 is in position to be engaged by arm 139 and prevent rebounding movement of the carriage. Each bracket 137 carries a plate 140 pivotally mounted thereon and normally resting on a suitable stop. Each plate 140 has a lug 141 engageable by a pin 133 on the related cam 129, when the pin is in the proper angular position relative to shaft 132.

When the elevator descends, lowering carriers, the carriers come to rest with their pins 88 seated in the saddles 89 at the top of the tanks and the downward overtravel of the elevator frees the rollers 99 of the carriages from the elevator track 46, so that the carriages swing forwardly to the position shown in Fig. 2. In such position, their rollers 99 are out of vertical alignment with the elevator track and, when the elevator rises, the carriers would be left behind, unless their carriages are swung back to vertical position, so that their rollers can be engaged by the track 46. The return swinging movement of the carriages is accomplished by the action of cams 129 as follows.

In operation of the machine, the shaft 132 is rotated stepwise one step each time the elevator rises. For this purpose, the shaft has a ratchet wheel 142 with eight teeth fast thereon (Fig. 8) and lying within a box-like structure 143 made up of plates welded together and secured to one flange of a beam 144 on the elevator structure similar to beam 43. Within the structure, the shaft also carries an arm 145 loose thereon and urged in one direction by a spring 146 attached at one end of the arm and at the other end to a fixed plate 147 forming part of the structure. The arm carries a spring-pressed pawl 148 engageable with the teeth of ratchet wheel 142 and is in position to be engaged upon rising of the elevator by an adjustable pin 149 attached to one of the beams 37 forming part of the machine framework overhanging the elevator. A stop pawl 150 mounted on part of the box structure 143 engages the teeth of ratchet wheel 142 to prevent return movement thereof.

In the machine illustrated, there are four pre-plating tanks and four plating tanks and the cams 129 lying above the pre-plating tanks are provided with four pins 133 spaced 90°, while the cams lying above the plating tanks each have a single pin 133 with the pins of the four cams over the plating tanks successively offset by 90° along the tanks. The action at the pre-plating tanks is as follows.

As the elevator descends with carriers above the pre-plating tanks, the carriages of those are released from the elevator during the downward over-travel of the latter, as previously described, and the elevator then rises leaving the carriers in the tanks. Near the end of the upward movement of the elevator, the arm 145 on the cam shaft 132 strikes the stop pin 149 and the ratchet wheel 142 is thereby advanced by one tooth equal to a 45° movement of the shaft and a pin 133 on each cam 129 above a pre-plating tank is advanced to the lowermost position on the cam. When the elevator approaches the end of its next downward movement, the plate 140 lying above each pre-plating tank engages the pad 108 at the top of arm 107 of the carriage of the carrier in such a tank and is swung upward. The swinging of plates 140 is arrested by engagement of their lugs 141 with the pins 133 in down position and, as the downward movement of the elevator continues, each arm 140 held fast by a pin 133 pushes down on the arm 107 of a carriage and swings the carriage to vertical position, so that the wheels 99 of the carriage overlie the elevator track. As the carriages are thus swung, the plates 104 at the top of the arms 103 on the carriages engage and swing aside the arms 135 forming part of the fixed stops, after which each arm 135 swings back to a position in front of its plate 104. When the elevator next rises, the carriages are prevented by engagement of arms 135 with plates 104 from swinging outwardly and the elevator track 46 enters the grooves of the wheels of the carriages, so that the carriages are picked up by the elevator.

During alternate round trips of the elevator from its down position in the operation of the machine, carriers are raised from and lowered to all the pre-plating tanks as above described and are similarly raised from and lowered to the finishing tanks. Also, during such alternate round trips of the elevator from its down position, a carrier is raised from one of the plating tanks and a carrier is lowered to the vacated tank. The raising of the carriers from the plating tanks is accomplished by the action of pins 133 on cams 129 engaging plates 140 on the carriers and, since each cam over a plating tank carries only one pin, the carrier is raised from such a tank only on every fourth round trip of the elevator. As the pins on the cams over the plating tanks are successively offset 90°, the plating cells are emptied in sequence.

In the machine so far described, the carriers are released from the conveyor above the tanks and the carriers are caused to be raised from the tanks by means including a single cam shaft and, in such machine, the carriages move to inoperative position by gravity, as soon as the carriers are seated on the tanks and the elevator frees the carriages. In the modified form of the machine shown in Figs. 12–16, incl., one shaft is employed for controlling the release of the carriers from the conveyor at the plating tanks and a second shaft is employed for controlling the raising of the carriers from the tanks.

The modified machine includes an elevator 151 of the same general construction as the elevator in the first form of the machine and provided with a track 152. A control shaft 153 mounted on the elevator carries a ratchet wheel 154 (Fig. 16) fast thereon and an operating arm 155 loose on the shaft is engageable on the upward movement of the elevator by a pin 156 on a fixed part of the machine framework. The arm 155 is acted on by a spring 157 attached at one end to the arm and at the other end to a fixed part 158 of a box structure 159 similar to the structure 143 and the arm carries an operating pawl 160 engaging the ratchet wheel 154. Return movement of the wheel is prevented by a stop pawl 161 carried by structure 159.

The control shaft 153 is made of a number of parts coupled end to end and, above each plating tank, a pair of blocks 162 are clamped on the shaft. A radial pin 163 is carried by one of the blocks and the pins 163 above the successive tanks are angularly spaced 90°. The shaft 153 also carries a pair of blocks above each of the pre-plating and post-plating tanks and each of these pairs of blocks carry four pins spaced 90°.

A control shaft 164 (Fig. 16) mounted in suitable bearings in brackets 165 on the machine framework carries a ratchet wheel 166 fast thereon and an arm 167 loosely mounted on the shaft carries an operating pawl 168 engageable with the teeth of the rachet wheel. The arm is urged in one direction by a spring 169 secured at one end to the arm and at the other end to one of the brackets 165. A stop pawl 170 on the bracket engages the ratchet wheel and prevents return movement thereof. The arm 167 carries an adjustable pin 171 in its outer end in position to be engaged by a part of the elevator, such as the channel member 172, so that each time the elevator rises the arm 167 is swung and the ratchet wheel and shaft 164 are advanced by one tooth. The ratchet wheel has eight teeth and that part of shaft 164, which lies above the plating tanks, carries four radial operating pins 173 disposed above the respective tanks and angularly spaced by 90°. Above each of the pre-plating and post-plating tanks, the shaft 164 carries a group of four pins spaced 90°.

The carriers of the modified form of the machine include top bars 174, on which are pivotally mounted plates 175 carrying grooved rollers 176. Each plate also has a spring-pressed latch 177 pivoted thereon and similar in construction and function to latch 100 and an arm 178 rigidly attached to the latch and generally similar to arm 103. Each plate 175 of a carriage has an arm 179 extending from its rear face.

The bar 174 of each carrier carries a block 180 supporting a pin 181, on which is pivotally mounted an intermediate operating arm 182 having a tail 182a engageable with the underside of the free end of arm 179 on the carriage. At its other end, arm 182 carries a roller 183 engageable with the flange of a channel member 184 of the elevator. The arm 182 is urged to swing clockwise as seen in Fig. 13 by a spring 185 connected at one end to the arm and at the other end to arm 179 on the carriage. Such swinging movement of arm 182 is restricted by a stop 186 on a bracket 187 secured to bar 174. The block 180 has a slot in its upper end, within which is mounted a bell-crank lever 188 urged upwardly by a spring 189. On the outer face of its vertical arm opposed to plate 182, lever 188 has a latch member 190 engageable with a similar member 191 on plate 182 and the horizontal arm of lever 188 lies directly beneath a pair of blocks 162 on shaft 153.

In the modified form of the machine, the intermediate operating arm 182 of each carrier lies in contact with stop 186 and with its tail 182a out of contact with arm 179 of the carriage of the carrier (Fig. 13), while the carrier is suspended by its carriage resting on the elevator track. In this position of the intermediate arm, the latch members 190 and 191 on the lever 188 and the intermediate arm 182, respectively, are out of contact and in the positions illustrated in Fig. 15. After the elevator has lowered the carriers to set them on the tank saddles and continues downward, the lower flange on channel member 184 on the elevator engages the rollers on the intermediate arms 182 and swings the arms counter-clockwise, as seen in Fig. 13. In such movement of the arms 182, their tails 182a act on the arms 179 on the carriages 175 to swing the carriages, so that their rollers 176 are out of the vertical path of the elevator track 152. As each arm 182 is thus swung, its latch member 191 moves past the latch member 190 on the associated lever 188 and the latch members are then in position to engage and hold the arms 182 against the force of their springs 185.

When the elevator rises, the intermediate arms 182 of carriers, which are to remain behind, are held in the position shown in Fig. 12, in which the arms hold their associated carriages 175 in inoperative position. In the initial upward movement of the elevator, the arms 182 are held in the positions stated by engagement of the flange member 184 on the elevator with the rollers 183 on arms 182 and, when the flange member loses contact with the rollers, the arms are held against relative movement by engagement of the latch members 190 and 191 associated therewith. When a carrier is selected to be raised from a tank by the elevator, the pin 163 on control shaft 153, which lies above the carrier, has been moved by rotation of the shaft to a position, in which it extends downward. When the pin 163 is in such position, it engages lever 188 on the carrier during the downward over-travel of the elevator and swings the lever, so that its latch member 190 cannot be engaged by the latch member 191. When the elevator then rises, the arm 182 swings clockwise, as seen in Fig. 13, and is free to do so because the latch members 190 and 191 are held ineffective by the action of the pin 163. As arm 182 swings as described, the carriage 175 of the selected carrier is simultaneously moved by spring 185 toward vertical position and the rollers 176 of the carriage move into position above the elevator track 152 in time to permit the rollers to be engaged by the track, so that the carriage is raised with the elevator.

In the modified form of the machine, the carriers are raised from the pre-plating and finishing tanks in alternate round trips of the elevator from its down position and, if the machine has four plating tanks each emptied once per revolution of the control shaft 153, on alternate round trips of the elevator, the ratchet wheel 154 on shaft 153 has eight teeth, so that angular movement of the shaft through 90° requires two round trips of the elevator. As the blocks 162 on the control shaft above the pre-plating and post-plating tanks carry four pins 163 spaced angularly 90°, the shaft is turned before each such alternate round trip starts, so that there is a downwardly extending pin 163 above each of the pre-plating and post-plating tanks. The pins in this position operate as above described to insure that the carriages of the carriers in those tanks will be picked up when the elevator next rises. A carrier is removed from a plating tank in each alternate round trip of the elevator and the plating tanks are emptied in sequence, since the shaft 153 carries a single pin 163 above each plating tank and the pins are effective in sequence once every eight round trips of the elevator.

Carriers raised by the elevator in the modified form of the machine are automatically connected by the latches 177 on their carriages to the chain 192 of a conveyor similar to that of the machine of Fig. 1. As the conveyor advances, the carriages of the carriers roll along the elevator track until the carriages are stopped by pins 173 on control shaft 164. Since a carrier is to be stopped above each of the pre-plating and post-plating tanks during each advance movement of the conveyor, the shaft 164 carries four equiangularly spaced pins 173 above each of those tanks, so that one of the pins is in operative position during alternate round trips of the elevator from its down position. Above each of the plating tanks, the shaft carries a single pin 173 and the pins above the four tanks are angularly offset 90°.

Each carrier raised from a pre-plating tank, except the last, that is, tank 31d, is moved by one tank spacing by the conveyor, while the carrier raised from tank 31d moves until it lies above the vacated plating tank. The carrier raised from the post-plating tank 33 also moves a distance substantially equal to a single tank spacing. When a carrier being advanced by the conveyor reaches a point above a tank where there is a pin 173 extending downward, the arm 178 on the carrier engages the pin and the arm is swung to the rear as the carrier continues to move, until latch 177 is detached from the conveyor. At this time, the axis of swinging movement of arm 178 lies beyond the downward projection of pin 173 and, when the carrier is lowered to free its arm 178 from pin 173 and the latch and arm are restored to vertical position, the arm lies beyond the downward projection of the pin. Accordingly, when the carrier is next raised, it can be advanced by the conveyor, even though there is a pin 173 above its tank in downward position at that time.

The modified form of the apparatus shown in Fig. 17 is similar to the form first described, except that the elevator structure 192 has two tracks 193, 194 spaced a distance substantially greater than the length of a plating barrel and each carrier 195 has carriages 196 mounted near opposite ends of its top bar 197 and adapted to run on tracks 193 and 194. The carriages are alike and preferably of the construction shown in Figs. 1A to 7, incl., and they are controlled by cams 198 on a pair of control shafts 199 similar to shaft 132 and connected by a chain 200 to rotate in unison. The elevator is provided with a pair of conveyors with chains 201, the links of which have extensions 201a in position to be engaged by the latches 202 on the respective carriages 196.

In the apparatus shown in Fig. 17, the pins of carriers, which are to be left in down position by the elevator, are seated on the tank saddles as the elevator descends and, during the downward over-running of the elevator, the carriages of the carriers swing outwardly, as shown in Fig. 17a, so that the wheels of the carriages lie out of the planes of vertical movement of tracks 193, 194. As the carriages of carriers at the plating tanks lie beyond the ends of the barrels of carriers being advanced over the plating tanks, solution dripping from a barrel being advanced along the plating tanks will not fall upon the carriages of the carriers in down position.

A barrel containing small workpieces, when immersed in the solution in any tank, should be rotated to agitate the workpieces and insure that they will all be reached by the solution. It is also desirable that a barrel be rotated as it is raised from a tank, so that solution carried out of the tank with the workpieces therein will be more quickly drained. In the machine of the invention, the rotation of the barrels in the tanks is effected by mounting a hollow column 203 (Figs. 1B, 2) on the base 30 of the machine adjacent each tank. A shaft 204 is supported for rotation in bearings attached to plates 205 secured to the columns near their lower ends and the shaft is driven by a motor 206. A guide rod 207 attached to each plate 205 extends parallel to the adjacent column and has its upper end attached to the top framework of the machine. The guide rod carries a fixed stop collar 208 adjacent its upper end. A slide 209 is movable along each column and its adjacent guide rod and each slide carries a pair of pulleys 210, 211. The slide is attached by a cable 212 passing over a grooved pulley 212a on the machine frame to a counterweight 213 in its column and the counterweight tends to move the slide to its top positon in contact with the upper collar 208. Adjacent its upper end, each guide rod 207 carries a pulley 214 and the shaft 204 carries a similar pulley 215 in line with pulley 214. A belt 216 is trained about pulleys 214 and 215 and, between them, forms a loop enclosing pulleys 210, 211. The shaft of pulley 211 carries a pinion 217 adapted to mesh with the gear 95 on shaft 94 on a carrier.

When carriers are supported on the elevator in the up position of the latter, the gears 95 on the carriers lie above the plane of the pinions 217 on the slides 209, which are held by their counterweights against the respective stops 208. As the elevator begins to lower a carrier to a tank, the gear 95 on the carrier meshes with pinion 217 on a slide 209 and, in the continued downward movement of the carrier, the slide moves with it. The shaft 204 is driven continuously, so that the pinions 217 are continuously operating, and, when the gear 95 of a workpiece carrier engages a pinion, the barrel of the carrier is caused to rotate. Since the belt 216 is looped about pulleys 210, 211 on the slide 209, the pinion 217 on the slide is continuously rotated regardless of the vertical position of the slide. When the elevator rises, the slides are raised by their counterweights to keep the pinions 217 in continuous contact with gears 95 on the carriers and the pinions drive the gears and rotate the barrels, until the slides 209 engage their up stop collars 208. As the elevator continues to rise, the gears 95 are raised above their pinions, so that the carriers may be moved along the elevator track without interference from the pinions.

The operation of the machine illustrated in Figs. 1A and 1B will be understood from the diagrams of Figs. 18 to 24, incl., which illustrate the successive operations making up a minor cycle and the first operation of the succeeding cycle. In the apparatus illustrated, the pre-plating tanks 31a–31d, incl., the plating tanks 32a–32d, incl., and the post-plating tank 33 are all of the same size and of the same spacing, although this is not necessary. The elevator track 46 extends forwardly beyond the first pre-plating tank 31a to provide a storage station SS of approximately the width of a tank and the track also extends beyond the post-plating tank 33 to provide a load-unload station LUL of about the width of a tank. The apparatus is shown is Fig. 18 in its condition at the end of the first operation in a minor cycle. The elevator supports a carrier with a barrel 85a containing a charge of raw workpieces at the storage station SS and the elevator has completed the ascending movement of its first round trip and has raised carriers with barrels 85 from each of the pre-plating tanks 31a–31d, incl., from the last plating tank 32d, and from the finishing tank 33. There is no carrier on the elevator above the load-unload station LUL.

As soon as the elevator has reached its uppermost position supporting the carriers described, the carriers are connected by their latches to the conveyor and are advanced thereby. The carrier 85a, which was above the storage station, moves by one tank spacing and is brought to rest above the first pre-plating station 31a by the action of a fixed stop. Each of the carriers raised from the pre-plating stations, except station 31d, are similarly advanced by one tank spacing and then released from the conveyor by the action of fixed stops. The carrier, which was raised from the last pre-plating cell 31d, is advanced by the conveyor until it lies above the vacated plating cell 32d and it is then detached from the conveyor by the action of a cam-controlled stop. The carrier, which was raised from cell 32d, is advanced to a point above the finishing tank 33 and released from the conveyor by a fixed stop, while the carrier that was raised from the finishing tank is brought to rest above the load-unload station by the stopping of the conveyor by a fixed stop. The second operation in a minor cycle has now been completed and the condition of the machine is as illustrated in Fig. 19.

When the carriers have been moved to the position shown in Fig. 19, the elevator is lowered, as shown in Fig. 20, and, at the end of its downward movement, all of the carriers lowered by the elevator are released therefrom, except the carrier above the load-unload station LUL. The third operation in a minor cycle is then completed.

The elevator remains in its down position for a period, during which the barrel at the load-unload station LUL can be emptied and recharged with raw workpieces. After an interval for the unloading and loading operations, the elevator is started upward by the control mechanism and raises with it only the carrier of barrel 85b loaded with fresh work. The second ascent of the elevator is the fourth operation in a minor cycle.

As soon as the elevator reaches its up position and the carrier 85b thereon is attached to the conveyor, the conveyor is started in the reverse direction by the control mechanism and moves the carrier backward over the treatment stations until the conveyor is stopped by limit switch 84 with the carrier above the storage station SS, as shown in Fig. 22. The fifth operation in a minor cycle is thus completed.

As soon as the return movement of the conveyor has ended, the elevator is lowered, as shown in Fig. 23. Prior to the downward movement of the elevator, the control shaft 132 has been moved to a position, in which the pins 133 thereon are effective to cause the carriers at all the pre-plating and post-plating tanks to be moved for pick-up by the elevator on the next upward movement thereof. Also, the pin 133 on the control shaft above the next plating tank 32c to be emptied has been moved to effective position. Upon completion of the second round trip of the elevator by its descent, the sixth and last operation of a minor cycle has been completed. When the elevator rises in its first round trip of the second minor cycle, it raises the carriers at the storage station, all the pre-plating and post-plating tanks, and the plating tank 32c. In the third and fourth minor cycles, the plating cells 32b and 32a are vacated and filled and, with the completion of the fourth minor cycle, a major cycle is completed, after which a new one starts.

The machine described is controlled by conventional means including a timer of standard construction, which starts the elevator on each up movement. The ascending movements of the elevator can be terminated in any convenient way, as, for example, by a limit switch actuated by the elevator as it reaches the upper limit of its travel. When the elevator comes to rest in its up position, the control mechanism starts the conveyor in either the forward or return movement, as required, and the conveyor movement is terminated in one direction by the limit switch 80 and in the other by the limit switch 84. When the conveyor has come to rest at the end of either movement, the elevator is started down by the control mechanism and its downward movement may be stopped by a limit switch.

In the apparatus, of which the operation is illustrated in the diagrams of Figs. 18 to 24, incl., a carrier suspended from the elevator at the load-unload station LUL cannot be detached from the elevator, so that the elevator must remain down during the loading and unloading of the barrel. Accordingly, the loading of a barrel and the movement of that barrel from station LUL to the storage station SS must take place in successive time intervals.

In some installations, it may be desirable to provide additional time for loading and unloading and this can be accomplished by the modified machine diagrammatically illustrated in Fig. 25.

The machine shown in Fig. 25 includes a storage station SS, four pre-plating stations 31a–31d, incl., six plating positions 32a–32f, incl., a finishing station 33, a pick-up station PS, and a load-unload station LUL. In this machine, when carriers have been raised from the stations and are advanced by the conveyor, the carrier raised from the finishing station 33 is moved over the top of the station PS and to the station LUL. Previously, the barrel of a carrier has been filled with raw workpieces at station LUL and has been moved from that station to station PS either manually or by a suitable transfer mechanism T. Accordingly, when the elevator moves down, the carrier above station LUL is detached from the elevator and remains at that station for loading and unloading when the elevator next rises. In such ascent of the elevator, it takes with it only the carrier containing the charge of raw work at station PS and, when the elevator reaches top position, the carrier raised with it is moved back by the return movement of the conveyor to a position above the storage station SS. During such return movement of the conveyor, the carrier at the load-unload station is being emptied and refilled and, as soon as these operations are completed, the carrier is moved to station PS. The apparatus is then in condition for the beginning of a minor cycle, in which carriers are raised from all the pre-plating and post-plating stations and from one of the treating positions. With the arrangement described, the loading and unloading operations can be performed during the movement of a carrier loaded with raw workpieces throughout the length of the machine to the station SS. Because of the additional time in each minor cycle, which may be employed for conveyor movements without decreasing the time necessary for loading and unloading, the machine may include additional plating positions and thus have a longer plating time than the machine illustrated in Fig. 18.

In the apparatus diagrammatically illustrated in Figs. 18 to 24, incl., the load-unload station LUL lies beyond the finishing tank 33, but, if desired, the barrels may be unloaded at this station, then transferred to the storage station SS, and loaded at the latter station. Also, if desired, the unloading and loading of the barrels may take place at a station ahead of the first preparation tank 31a. If the barrels are to be unloaded at one end of the machine and loaded at the other, the control mechanism provides a dwell sufficient for unloading, when a barrel has been delivered to the station just beyond the finishing tank, and a second dwell sufficient for loading the empty barrel, after that barrel has been moved to the station just ahead of tank 31a. If both loading and unloading are to take place at a station ahead of tank 31a, the return movement of the conveyor starts as soon as the elevator rises following the descent, in which it left barrels in the several tanks. When the barrel to be emptied and reloaded reaches the station ahead of tank 31a, a dwell occurs sufficient for the unloading and loading operations.

When the machine is arranged with a pick-up station adjacent the load-unload station, as shown in Fig. 25, the return movement of the conveyor may start as soon as the elevator has risen following its descent to leave carriers at the tanks. When the barrel containing raw work has been moved from the pick-up station PS to the storage station SS, there is a dwell in the operation to provide the required time for the plating action. During the return movement of the barrel containing raw work and also during the dwell, the barrel last removed from the finishing tank can be unloaded and loaded.

In all forms of the apparatus, it is desirable to provide a dwell after the carriers have been lifted from the tanks in order that the work may drain so as to carry as little solution as possible from one tank to the next. Such a dwell is provided by the timer of the control mechanism.

I claim:

1. A processing machine, which comprises a plurality of treatment stations arranged in a row, carriers for the workpieces to be treated, an elevator having a track for supporting the carriers and extending along the stations, means for moving the elevator to raise and lower carriers on the track at the stations, a conveyor disposed near the track when the elevator is up and running during spaced periods and alternately in opposite directions along the row of treatment stations, means on the carriers operable when the elevator is up for connecting carriers on the track to the conveyor for movement therewith in either direction, and means for releasing carriers from the moving conveyor above predetermined stations, the releasing means operating during each movement of the conveyor in one direction only.

2. The processing machine of claim 1, which includes means for selectively controlling the connection of the carriers to the elevator in the down position of the latter.

3. The processing machine of claim 2, in which the means for selectively controlling the connection of the carriers to the elevator are mounted on the elevator and operated in response to movements thereof.

4. The processing machine of claim 3, in which the means for selectively controlling the connection of the carriers to the elevator include a shaft mounted on the elevator to extend over the stations and having operating elements thereon above respective stations, and the shaft is rotated stepwise by means actuated by elevator movements to bring the operating elements successively to effective position.

5. The processing machine of claim 4, in which the operating elements at certain stations are brought to effective position on alternate round trips of the elevator and the operating elements above other stations are brought successively into effective position in accordance with a cycle on alternate round trips of the elevator.

6. The processing machine of claim 2, in which the means for controlling the connection of the carriers to the elevator and the means for releasing the carriers from the conveyor are mounted on the elevator.

7. The processing machine of claim 6, in which the means for controlling the connection of the carriers to the elevator and the means for releasing the carriers from the conveyor include a common shaft mounted on the elevator to extend over the stations.

8. The processing machine of claim 1, in which each carrier has a carriage pivotally mounted thereon and having rollers adapted to rest on and roll along the elevator track with the carrier below the track, the carriages are biased to move their rollers out of the vertical path of movement of the track, when the elevator deposits the carriers at the stations, and the elevator carries means operable to cause the carriages of selected carriers to be moved to place their rollers in position for pick-up of the carriers by the elevator on the next ascent of the latter.

9. The processing machine of claim 8, in which the carriages move by gravity to place their rollers out of position for pick-up by the elevator, when the elevator deposits the carriers at the stations, and the elevator carries means for engaging and moving the carriages of selected carriers to place their rollers in position for pick-up by the elevator track.

10. The processing machine of claim 1, in which the carriers have movable latches and means biasing the latches to engage the conveyor and connect the carriers thereto, when the elevator reaches up position, and the means for releasing the carriers from the conveyor engage the latches and move them to inoperative position.

11. The processing machine of claim 10, in which the conveyor has a plurality of pins, the latches are spring-pressed to a position, in which they can engage respective conveyor pins, and the means for releasing the carriers from the conveyor are stops adapted to engage the latches and cause them to move out of engagement with the conveyor pins.

12. In a processing machine, the combination of a plurality of treatment stations, an elevator having a track extending along the stations, a conveyor including an endless element having a stretch running parallel to the track, means for actuating the conveyor to cause said stretch to move alternately in opposite directions, a plurality of workpiece carriers movable along the track and having latch means for connecting them to said stretch of the element, when the elevator is in the up position, said latch means being effective regardless of the direction of movement of said stretch, and means on the elevator above respective stations for stopping carriers being advanced by the conveyor by engaging and rendering inoperative the latch means of the carriers, said stopping means being effective during movement of said stretch of the conveyor in one direction only.

13. The combination of claim 12, in which each carrier has a carriage rolling along the track and movable out of the vertical path of the track, when the carrier is deposited at a station by the elevator, and the elevator carries means for moving the carriages of selected carriers into position above the track, when the elevator is in down position, and holding the carriages in such position to be picked up by the track, when the elevator rises.

14. A processing machine, which comprises a group of stations including a plurality of preparation stations, a treatment station having a plurality of treatment positions, and at least one finishing station, an elevator above the stations having a track extending the length of the group of stations, a plurality of workpiece carriers having carriages movable along the track and movable out of engagement with the track, a conveyor operable to engage and move carriers in either direction along the track, means at each of the preparation stations except the last and at the finishing station for releasing carriers from the moving conveyor at the respective stations, and means at the positions of the treatment station operating in sequence to release from the moving conveyor at the successive positions carriers being advanced by the conveyor from the last preparation station, the releasing means at the preparation, finishing, and treatment stations being effective during movement of the carriers by the conveyor in one direction only.

15. The processing machine of claim 14, in which carriers being lowered by the elevator to the stations and treatment position are automatically detached from the elevator, when the latter approaches its down position, and means are provided for causing carriers at selected stations to be attached to the elevator to be raised thereby, the attaching means at all the preparation and finishing stations operating on alternate ascents of the elevator and the attaching means at the treatment positions operating cyclically with the carriers raised from the positions in sequence, one carrier being raised from a position on each of the alternate ascents of the elevator.

16. The processing machine of claim 15, in which the attaching means include a shaft mounted on the elevator and extending over the stations, the shaft carrying means at the respective stations for causing carriers at such stations to be moved to a position, in which they will be engaged and raised by the elevator on the next ascent of the elevator.

17. The processing machine of claim 16, in which the shaft carries means at the stations for releasing carriers from the conveyor.

18. The processing machine of claim 14, in which the means for releasing carries from the conveyor include a shaft lying parallel to the elevator track and having operating elements at the respective stations.

19. In a processing machine having a plurality of stations, the combination of a conveyor extending along and above the stations, a plurality of workpiece carriers, each including a rotatable barrel and means, by which the barrel can be rotated, an elevator for moving the carriers between the stations and conveyor and having a track, along which the carriers may be moved by the conveyor, and means for rotating the barrels of carriers at least some of the stations and during their vertical movements to and from such stations, each rotating means including a vertically movable slide, means for urging the slide upward, and a continuously operating rotary driving element mounted on the slide and engageable with the rotating means of a barrel at the station on being moved relative to the station by the elevator.

20. The combination of claim 19, in which each barrel rotating means includes a rotary member and the driving element is engageable with the member to rotate it and is driven by a belt extending around top and bottom stationary pulleys and having a loop about a pair of pulleys on the slide, one of the pulleys on the slide being connected to the driving element.

21. In a processing machine, a carrier for workpieces comprising a top bar, a carriage mounted on the top bar to swing on a pivot transverse to the top bar, the carriage carrying a pair of rollers mounted thereon for rotation on axes transverse to the pivot, a latch mounted on the carriage to swing on a pivot parallel to said axes, a spring urging the latch in one direction, an arm attached to the latch and operable to swing the latch in the opposite direction, and a projection on the carriage extending transverse to the carriage pivot, the carriage tending to swing in a direction such as to move the projection upward, and a stop limiting the swinging movement of the carriage.

22. A processing machine having a plurality of treatment stations, carriers for the workpieces to be treated, means for supporting the carriers in lower positions at the respective stations, an elevator for moving the carriers between their lower positions and upper positions above the stations, a conveyor for engaging carriers in their upper positions and moving them horizontally, means for operating the conveyor alternately in opposite directions, and means aligned with respective stations for disengaging from the moving conveyor carriers being moved horizontally thereby, the disengaging means being effective during movement of the conveyor in one direction only.

23. The processing machine of claim 22, which includes a pair of tracks mounted on the elevator and extending along the stations, a pair of wheeled carriages on each carrier adapted to roll along the tracks, the carriages being pivoted on the carrier and moving out of the vertical path of movement of the tracks, when the carrier is deposited at a station by the elevator, and means on the elevator for moving the carriages of selected carriers into position above the tracks, when the elevator is down, and holding the carriages in such positions until the tracks on the elevator engage said carriages and start to raise the carriers.

24. The processing machine of claim 23, in which the elevator carries means for simultaneously disengaging from the moving conveyor above respective stations both carriages of carriers to be left at such stations.

25. The processing machine of claim 22, which includes means mounted on a fixed part of the machine adjacent respective stations for disengaging from the moving conveyor carriers being moved horizontally in one direction only thereby, and means mounted on the elevator operable to connect selected carriers to the elevator to be raised therewith with the other carriers remaining in their lower positions.

26. The processing machine of claim 25, in which the carrier-disengaging means include a shaft mounted on a fixed part of the machine and the carrier-connecting means include a shaft mounted on the elevator, both shafts being advanced stepwise.

27. A processing machine having a plurality of treatment stations in a row, an elevator having a track extending along the row of stations, a plurality of carriers for workpieces to be treated, the carriers being movable along the track, means for operating the elevator to raise and lower carriers on the track at the stations, a conveyor operable to engage carriers on the track when the elevator is up and to move the engaged carriers along the track, means for moving the conveyor in opposite directions in alternation with its movement in one direction shorter than its movement in the other direction, and means operating during each short movement of the conveyor to release carriers being moved thereby at selected stations.

28. The processing machine of claim 27, in which the long movement of the conveyor is longer and the short movement of the conveyor is shorter than the length of the row of treatment stations.

29. The processing machine of claim 28, in which the treatment stations include in the order stated a plurality of preparation stations, a station having a plurality of treatment positions, and at least one finishing station and the short movement of the conveyor is in the direction from the preparation stations toward the finishing station and is longer than the station having a plurality of treatment positions.

30. The processing machine of claim 22, in which the disengaging means includes a shaft extending the length of the treatment stations and rotated in timed relation to the movements of the elevator.

References Cited in the file of this patent
UNITED STATES PATENTS

| | | |
|---|---|---|
| 1,263,043 | Curtis | Apr. 16, 1918 |
| 2,709,010 | Todd | May 24, 1955 |
| 2,716,415 | Davis et al. | Aug. 30, 1955 |